United States Patent [19]

Ilyadis et al.

[11] Patent Number: 5,898,694
[45] Date of Patent: Apr. 27, 1999

[54] METHOD OF ROUND ROBIN BUS ARBITRATION

[75] Inventors: Nicholas Ilyadis, Pepperell, Mass.; William J. Tiffany, Austin, Tex.

[73] Assignee: Cabletron Systems, Inc., Rochester, N.H.

[21] Appl. No.: 08/774,775

[22] Filed: Dec. 30, 1996

[51] Int. Cl.[6] ..................................................... H04J 3/14
[52] U.S. Cl. ........................ 370/462; 370/461; 395/293; 395/287; 395/300; 395/303; 395/296; 395/291
[58] Field of Search ................................... 370/461, 462; 395/293, 296, 300, 303, 291, 292, 294, 295, 297, 298, 287

[56] References Cited

U.S. PATENT DOCUMENTS

| | | | |
|---|---|---|---|
| 3,611,305 | 10/1971 | Greenspan et al. | 340/172.5 |
| 4,229,791 | 10/1980 | Levy et al. . | |
| 4,463,445 | 7/1984 | Grimes | 364/900 |
| 4,560,985 | 12/1985 | Strecker et al. . | |
| 5,072,363 | 12/1991 | Gallagher | 395/725 |
| 5,109,379 | 4/1992 | Kume et al. | 370/94.3 |
| 5,119,292 | 6/1992 | Baker et al. | 395/725 |
| 5,230,044 | 7/1993 | Cao et al. . | |
| 5,282,272 | 1/1994 | Guy et al. | 395/275 |
| 5,301,333 | 4/1994 | Lee | 395/725 |
| 5,390,299 | 2/1995 | Rege et al. . | |
| 5,487,170 | 1/1996 | Bass et al. | 395/732 |
| 5,546,543 | 8/1996 | Yang et al. . | |
| 5,594,733 | 1/1997 | Katoen et al. | 370/449 |
| 5,689,657 | 11/1997 | Desor et al. | 395/730 |

FOREIGN PATENT DOCUMENTS

| | | |
|---|---|---|
| 0159592 | 10/1985 | European Pat. Off. . |
| 2287621 | 9/1995 | United Kingdom . |

*Primary Examiner*—Jason Chan
*Assistant Examiner*—Jasper Kwoh
*Attorney, Agent, or Firm*—Wolf, Greenfield & Sacks, P.C.

[57] ABSTRACT

An arbitration unit contains a method of arbitration which includes distributed arbitration, a priority mechanism to support different classes of traffic, a unique arbitration ID bits for each module, a round robin arbitration within a given priority level to produce fair access to a bus 36, an arbitration timeout, and a bandwidth allocation between priority levels. The method of round robin bus arbitration includes the steps of providing a plurality of modules, providing a bus having a plurality of data lines, the bus connecting the plurality of modules, the bus having an arbitration unit, setting the bus to a wait state, signaling a first bus request to the bus by a first module needing to transmit a first plurality of data packets on to the bus, the first module having a first module priority level and a first unique arbitration number, signaling a second bus request to the bus by a second module needing to transmit a second plurality of data packets on to the bus, the second module having a second module priority level and a second unique arbitration number, establishing a bus priority according to a comparison of the first module priority level and the second module priority level, asserting the first unique arbitration number on the bus by the first module, asserting the second unique arbitration number on the bus by the second module, determining whether the first module and the second module have been waiting for the bus, comparing the first unique arbitration number and the second unique arbitration number, scheduling transmission of data packets in response to the steps of determining and comparing, and repeating the steps of setting, signaling, establishing, asserting, determining, comparing, and scheduling.

12 Claims, 5 Drawing Sheets

METHOD OF ROUND ROBIN BUS ARBITRATION

BACKGROUND OF THE INVENTION

The present invention relates to the field of digital data processing systems, and more particularly, to the field of networks wherein units of the network are connected to a high speed bus requiring arbitration for access and data transfer.

As is well know in the art, as computer networks have grown in size and complexity, the need for high speed data transfer has increased. Among the types of data transfer devices which provide high speed transport between shared resources, such as bridges or switches, is the use of a high speed shared channel or bus. With such an arrangement, network efficiency and utilization is strongly affected by the procedure for controlling access to the high speed bus or channel.

As is also known, in general a transmission of data between two units over a high speed bus or channel requires two steps, since more than one unit has the capability of originating a transmission. The first step is for the transmitting unit to obtain control of the bus for some more or less defined interval. Once the selection step is completed, a second (or transfer) step is used to complete the transfer that is controlled by the selected transmitting unit.

Obtaining control of the bus requires contending with other units desiring bus access, to arbitrate and determine which one will be selected. As is known in the art, there are two principal generic approaches to arbitration. These are central arbitration and distributed arbitration approaches. In the central arbitration, a single, central priority circuit or device receives all the requests for bus access and determines which requesting unit at any given time should be accorded the greatest priority and allowed to use the bus. Once the unit is selected, it is allowed to control the bus and effect the transfer. By contrast, in distributed arbitration, each unit connected to a bus is assigned a specific priority and each unit individually determines whether it has sufficient priority to obtain control of the bus when it desires to do so. If a unit of higher priority simultaneously seeks bus access, a device of lower priority must wait until some later time when it is the highest priority requester.

As is also known, in choosing a method of arbitration, fairness is assured when each unit connected to the bus has substantially equal average priority for obtaining bus access. One such approach to guaranteeing fairness is a primitive round robin method. With such a method, for each unit, two delay interval possibilities exist; the delay selection for each unit is switched from time to time, on a round-robin basis, such that all units are given equal average priority.

In today's networks, data of more than one protocol may also coexist and be transferred from unit to unit in the network via the high speed bus. Examples of different protocols are Ethernet, FDDI, and Asynchronous Transfer Mode (ATM). Therefore, a method of arbitration is required that will not only guarantee fairness, but one that can handle data of both similar and different protocols.

SUMMARY OF THE INVENTION

In accordance with one embodiment of the present invention, a method of round robin bus arbitration includes the steps of providing a plurality of modules, providing a bus having a plurality of data lines, the bus connecting the plurality of modules, the bus having an arbitration unit, setting the bus to a wait state, signaling a first bus request to the bus by a first module needing to transmit a first plurality of data packets on to the bus, the first module having a first module priority level and a first unique arbitration number, signaling a second bus request to the bus by a second module needing to transmit a second plurality of data packets on to the bus, the second module having a second module priority level and a second unique arbitration number, establishing a bus priority according to a comparison of the first module priority level and the second module priority level, asserting the first unique arbitration number on the bus by the first module, asserting the second unique arbitration number on the bus by the second module, determining whether the first module and the second module have been waiting for the bus, comparing the first unique arbitration number and the second unique arbitration number, scheduling transmission of data packets in response to the steps of determining and comparing, and repeating the steps of setting, signaling, establishing, asserting, determining, comparing, and scheduling.

BRIEF DESCRIPTION OF THE DRAWINGS

The novel features believed characteristic of the invention are set forth in the appended claims. The invention itself, however, as well as other features and advantages there of, will be best understood by reference to the detailed description of specific embodiments which follows, when read in conjunction with the accompanied drawings, wherein:

DETAILED DESCRIPTION OF THE PREFERRED EMBODIMENT(S)

Figure 1:
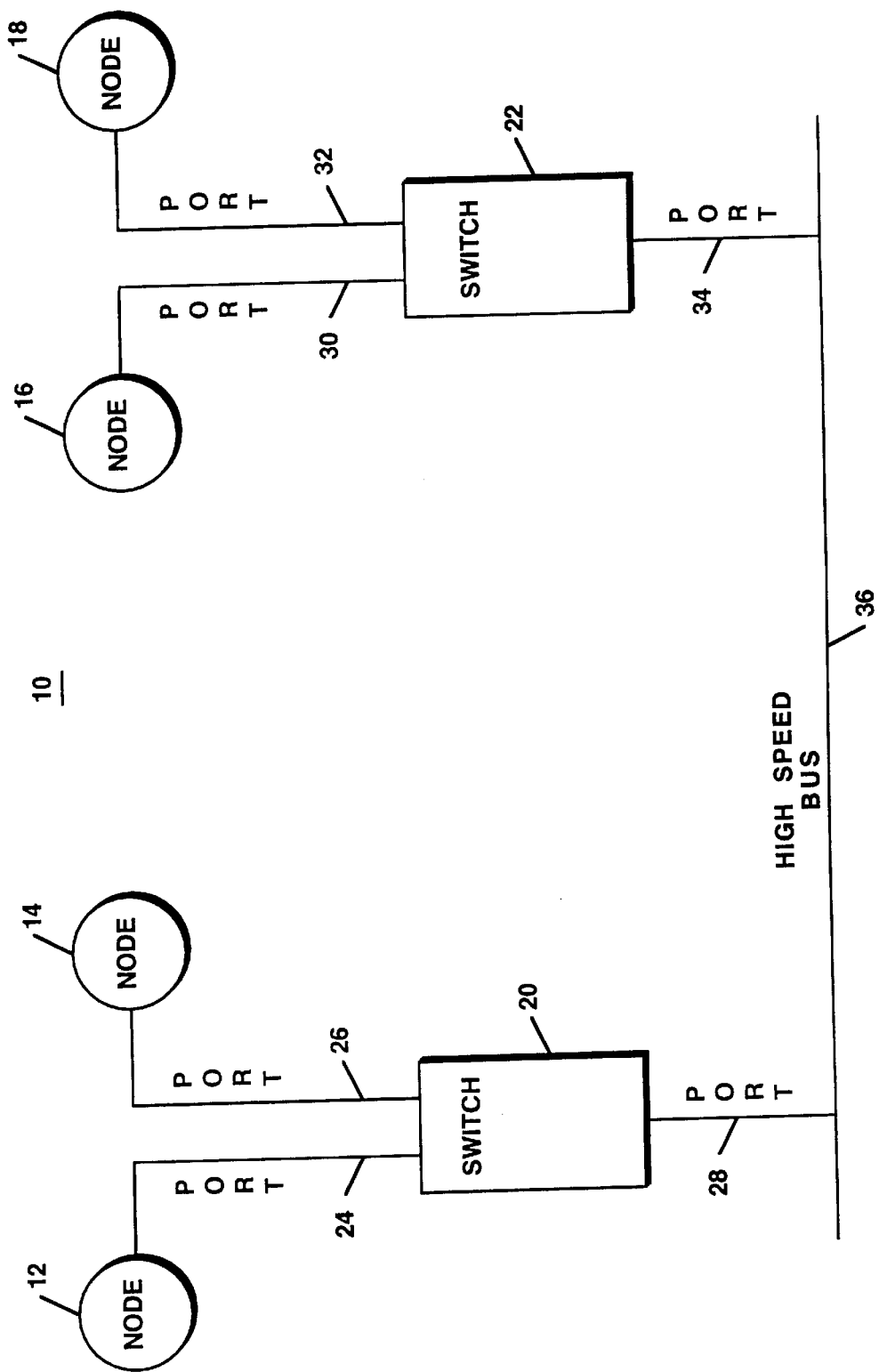
FIG. 1 is a block diagram illustrating an exemplary local area network (LAN)

Referring to FIG. 1, an exemplary local area network (LAN) 10 is shown to include four nodes or modules labeled as 12, 14, 16, and 18, respectively. The exemplary LAN 10 is also shown as including two switches labeled as 20 and 22, respectively. Switch 20 includes three ports labeled as 24, 26, and 28, respectively, while switch 22 is shown having three ports labeled as 30, 32, and 34, respectively. Switch 20 is shown to be connected to a high speed bus 36 via port 28, while switch 22 is shown connected to the high speed bus 36 via port 34.

An exemplary transmission of data from node 12 (source) to node 18 (destination) proceeds in the following manner. A frame of data leaves node 12 and travels into switch 20 via the port 24. While in the switch 20, the frame is analyzed and checked for a source and destination address. If the source address and the destination address are valid, the data leaves the switch 20 and arbitrates for bus access. Once bus access is obtained, the frame of data is placed on the high speed bus 36 via port 28. The data on the high speed bus 36 arrives at switch 22 via port 34, and flows on to node 18 via port 32.

It will be appreciated that the exemplary LAN 10 may contain more than the number of nodes or modules and switches illustrated. In addition, in the exemplary transmission explained above, node 12 (or any of the other nodes)

may be an Ethernet network adhering to the Ethernet protocol, while node 18 (or any of the other nodes) may be an Fiber Distributed Data Interface (FDDI) network adhering to the FDDI protocol. Furthermore, one or more of the nodes illustrated in FIG. 1 may be of the Asynchronous Transfer Mode (ATM) type, and thus adhere to the ATM protocol.

Figure 2:
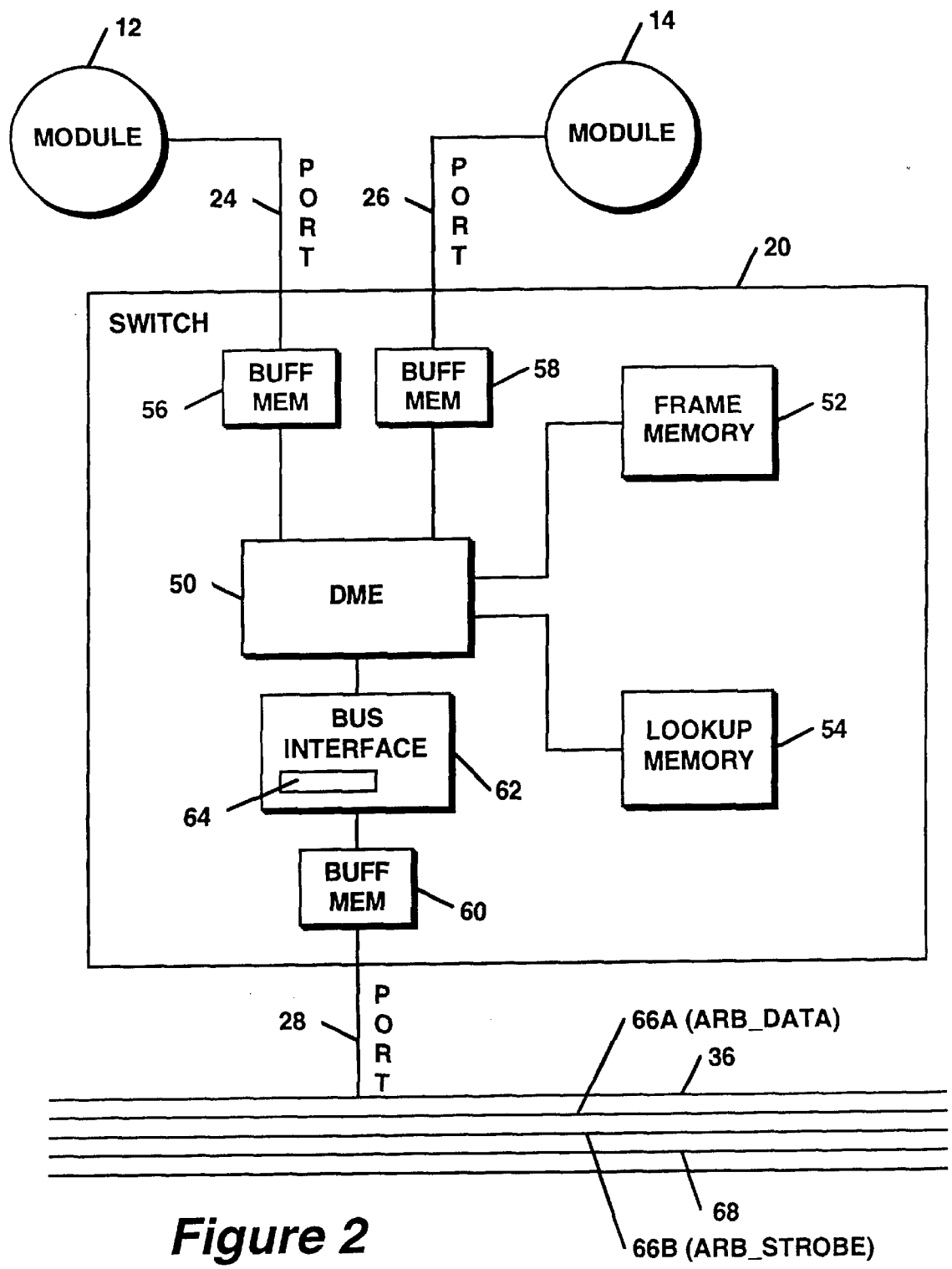
FIG. 2 is a block diagram illustrating an exemplary switch.

Referring now to FIG. 2, the switch 20 of FIG. 1 is shown to include a Data Moving Engine (DME) 50, a frame memory 52, and a lookup memory 54. Further, the DME 50 is shown to be connected to the ports 24, 26, and 28. In addition, each port is shown to have a corresponding buffer memory in the switch 20. Thus, port 24 is associated with buffer memory 56, port 26 is associated with buffer memory 58, and port 28 is associated with buffer memory 60. Furthermore, the switch 20 is shown to include a bus interface 62. The bus interface 60 provides an interface between the DME 50 and the bus 36 through buffer memory 60 and port 28. In a preferred embodiment, the DME 50 is a custom ASIC designed by Digital Equipment Corporation; it performs unicast transparent bridge forwarding (i.e., switching) at up to 1,000,000 pps, advanced bridge filtering, and core LAN functions at very high speeds. The DME 50 can support up to 48 bridged ports. The lookup memory 54 is used for data structures required by bridging and application code, while the frame memory 52 is used to store the configuration and operational code, and to run the code. When a frame of data arrives on a port, port 24 for example, the DME 50 checks the frame memory 52 and the lookup memory 54 to insure that the frame contains a valid source address and a valid destination address. Data leaving switch 20 flows from the DME 50 and on to the bus 36 via port 28.

Data arriving at switch 20 comes off the bus 36 and flows into the DME 50 via port 28. Again the DME 50 checks the received data for valid source and destination address in the frame memory 52 and the lookup memory 54, and then forwards the data to the appropriate node via the appropriate port, node 12 via port 24, for example.

The present invention resides in the bus interface of the switch, bus interface 62 in switch 20, for example. As stated above, the bus interface 62 is an interface between the DME 50 and the bus 36. In a preferred embodiment, the bus interface 62 is implemented in CMOS technology and typically runs at 50 MHz. It contains an FDDI MAC Transmit Interface (TX) and an FDDI MAC receive interface (RX) with the DME 50. The TX interface runs at 50 MHz and consists of the following signals: a byte wide TX data path, TX parity, TX control lines, TX ready, and TX abort.

As mentioned previously, the bus interface 62 contains a hub backplane arbitration and bandwidth allocation logic device (Arb) 64. This Arb 64 includes the following (more fully described below): distributed arbitration, priority mechanism to support different classes of traffic, unique arbitration ID bits for each module, round robin arbitration within a given priority level to produce fair access to the bus 36, arbitration timeout, and bandwidth allocation between priority levels. The Arb 64 typically runs at 10 MHz.

After the bus interface 62 receives a TX cell from the DME 50 and the bus interface wins arbitration to the bus 36, a burst transmission process initiates with a transmission of a start cell delimiter onto the bus 36. The start burst delimiter is defined as a 3 clock (50 MHZ) sequence of the following: all_ten_bits_zero, all_ten_bits_one, all_ten_bits_zero. For example, for 3 clock cycles the following pattern is sent out: 0-1-0 on all ten bits. Once a transmitter starts to send the 0-1-0 start delimiter it will continue to send the entire start delimiter. An abort will not occur during the start cell delimiter. Immediately following the start delimiter, 8 bits of data, and the parity and frame bits are transmitted. Except for the last 2 bytes, the frame bit will be high for the entire burst. In order to reduce inter-packet gap, the frame bit is dropped 2 bytes prior to the end of the burst. A receive logic in the Arb 64 looks at the frame bit to generate a bus idle signal for the transmit logic. With the frame bit dropping early, bus idle is generated earlier and the inter-packet gap is minimized. In addition to the frame bit, 1 bit provides parity (default is odd); this parity bit covers the 8 bits and the frame bit. If the transmit logic encounters an error, such as parity error, protocol error, or the DME 50 aborted the burst, then an abort delimiter (all ten bits forced to 1's) will be transmitted on to the bus 36.

The bus interface 62 receives a byte of data from the bus 36 every 20 ns (50 MHz). The bus interface 62 receive logic in the Arb 64 samples all 10 bits from the bus 36 at an effective sampling rate of 300 MHZ. The receive logic searches for the start burst delimiter, 0-1-0. This pattern is searched for on each of 10 bits. For each bit, the receive logic searches for a start burst delimiter and for the middle of the data, for each of 10 bits, i.e., the receiver attempts to find the best sampling point for each bit. Once a start burst delimiter has been detected for all 10 bits, the receive logic asserts a valid data signal to a bus interface/DME RX interface (not shown) and the burst is sent to the DME 50. If a start burst delimiter has been detected on any of the 10 bits and within the next 50 MHz clock cycle, the remaining bits have not seen a start burst delimiter, a start burst error will be asserted in an interrupt register. The bus interface 62 receives from the bus 36 8 bits of data, a frame bit, and a parity bit covering data and the frame bit. If an abort delimiter is received, the receive logic sees this as a parity error and the parity error bit at the RX end is asserted high and the DME 50 will drop the burst.

As can be seen in FIG. 2, the bus 36 includes a serial two wire bus labeled as 66A and 66B, respectively. The serial two wire bus 66A and 66B allows arbitration to occur independently of a parallel data bus 68.

Figure 3:
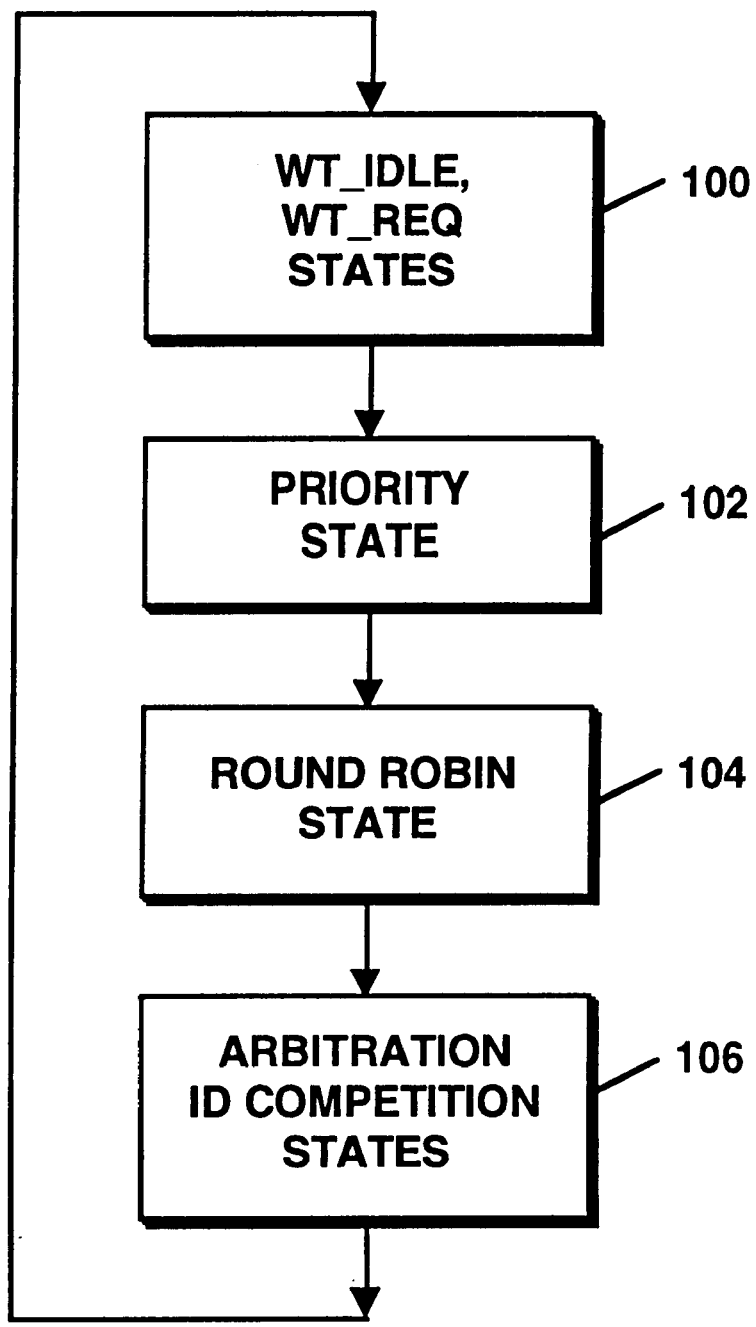
FIG. 3 is a high level flowchart illustrating the arbitration process in accordance with the principles of the invention.

Referring to FIG. 3, a high level flowchart of an arbitration process according to the invention is shown to be a sequential process wherein the following definitions will aid in the understanding of the process:

ARB_STRPOBE Backplane WIRED-OR signal asserted by participating modules during the arbitration sequence. The assertion of ARB_STROBE synchronizes the arbitration state machines in all modules. A module drives the backplane ARB-STROBE signal by asserting its internal TX_ARB_STROBE signal. A module monitors the state of the backplane ARB-STROBE signal by its internal RCV_ARB_STROBE signal.

ARB_DATA Backplane WIRED-OR signal used for the arbitration signaling process. ARB_DATA is activated by modules which are PARTICIPATING in a bus arbitration to signal their priority round robin bit and arbitration number. A module drives and monitors the backplane ARB_DATA signal by the internal TX_ARB_DATA and RCV_ARB_DATA signals.

RR_BIT_P0,_P1 Module internal signal used to insure fair access to the bus based on sequencing through arbitration, IDs. Modules set their RR bit whenever the arbitration process completes with the winning module having a 4-bit arbitration ID number higher than theirs.

When a module wins the arbitration process or if a module with a lower number wins the arbitration process, then the module clears its RR bit. Thus if a module passes up its turn because it does not have a request to assert, it clears its RR bit and waits in line again.

Modules just entering the arbitration process should do so with their RR bits cleared to insure they do not alter the sequence.

Modules have separate RR bits to each priority level. Thus different priority levels round robin independently of each other.

PARTICIPATING A module is a bystander during an arbitration cycle if it does not have a bus request. If a participating module loses an arbitration bit period or if its request is deasserted the module becomes a bystander. Bystander modules do not assert ARB_STROBE. Bystanders must remain in sync with the arbitration process and monitor the arbitration in order to update their round robin bits correctly.

During an arbitration sequence a module may transition from PARTICIPATING to BYSTANDER but never vice versa.

BUS_REQUEST Asserted by a modules transmit data path to the Arb logic to trigger the Arb logic to participate in a bus arbitration. The PRIORITY line to the Arb logic must be valid whenever the BUS_REQUEST line should stay asserted until the Arb logic returns a BUS_GRANT if the BUS_REQUEST line is deasserted by the transmit data path prior to the assertion of BUS_GRANT the Arb logic will abort the arbitration by transitioning to the BYSTANDER state.

BUS_GRANT Asserted by the Arb logic to the transmit data path upon winning the Arb process and entering the MASTER_ELECT state. Remains asserted until BUS_REQUEST is deasserted by the transmit data path.

The following states can exist on the serial arbitration bus:

ARB_IDLE Both ARB_STROBE and ARB_DATA deasserted.

ARBITRATE ARB_STROBE asserted, ARB_DATA may be asserted or deasserted. Arbitration runs to completion at which point the winner (MASTER_ELECT) releases ARB_DATA and continues to assert ARB_STROBE until becoming bus master. For a given application, there will be an upper bound on how long the arbitration bus may remain in the ARBITRATE state before transitioning to the ARB_IDLE state. This will depend upon the max length of the packets allowed by an application. The arbitration watchdog timer will time the arbitration process to detect a "hung" arbitration sequence.

Illegal ARB_STROBE deasserted, ARB_DATA asserted.

Referring now to FIG. 3, the sequence of events occurring, in the system represented in FIG. 2, during the arbitration process of the invention is as follows: at step 100 the bus 36 is in a WT_IDLE state or a WT_REQ state until at least one module connected to the bus 36 signals a request. The WT_IDLE state is entered under the following conditions:

o reset o by the master elect module when it receives an acknowledgment to the bus grant it passed to its data path logic (bus requests deasserts)

o when a bystander module exits the ARB_ID_BIT0 state o when a participating module losses arbitration and exits the ARB_ID_BIT0 state o when the arbitration winner is exiting the ARB_ID_BIT0 state and detects that the BUS_REQUEST from its data path is no longer asserted (the data path chose to abort the transaction).

At step 102, all modules wishing to request the bus 36 signal their priority level. The highest signaled priority level is established in this step.

At step 104, a determination is made whether modules wishing to use the bus 36 have been waiting their turn (RR bit set), or have taken their turn and have a new request (RR bit cleared). Modules waiting in line have a higher priority.

At step 106, modules having a unique arbitration number (4 bits) compete for access to the bus 36, with the higher arbitration number winning.

During each of the arbitration steps in FIG. 3, participating modules assert TX_ARB_STROBE and signal the value of their arbitration number on the TX_ARB_DATA line. After settling time, the value of the TX_ARB_DATA line is sampled. If the value matches what the module signaled, the module continues to participate in the next state. If the bus value does not match what the module signaled, the module loses the competition and ceases to participate (releases the TX_ARB_STROBE,_DATA lines). The WIRED-OR bus 36 guarantees that the module with the highest number will win the competition.

Figure 4:
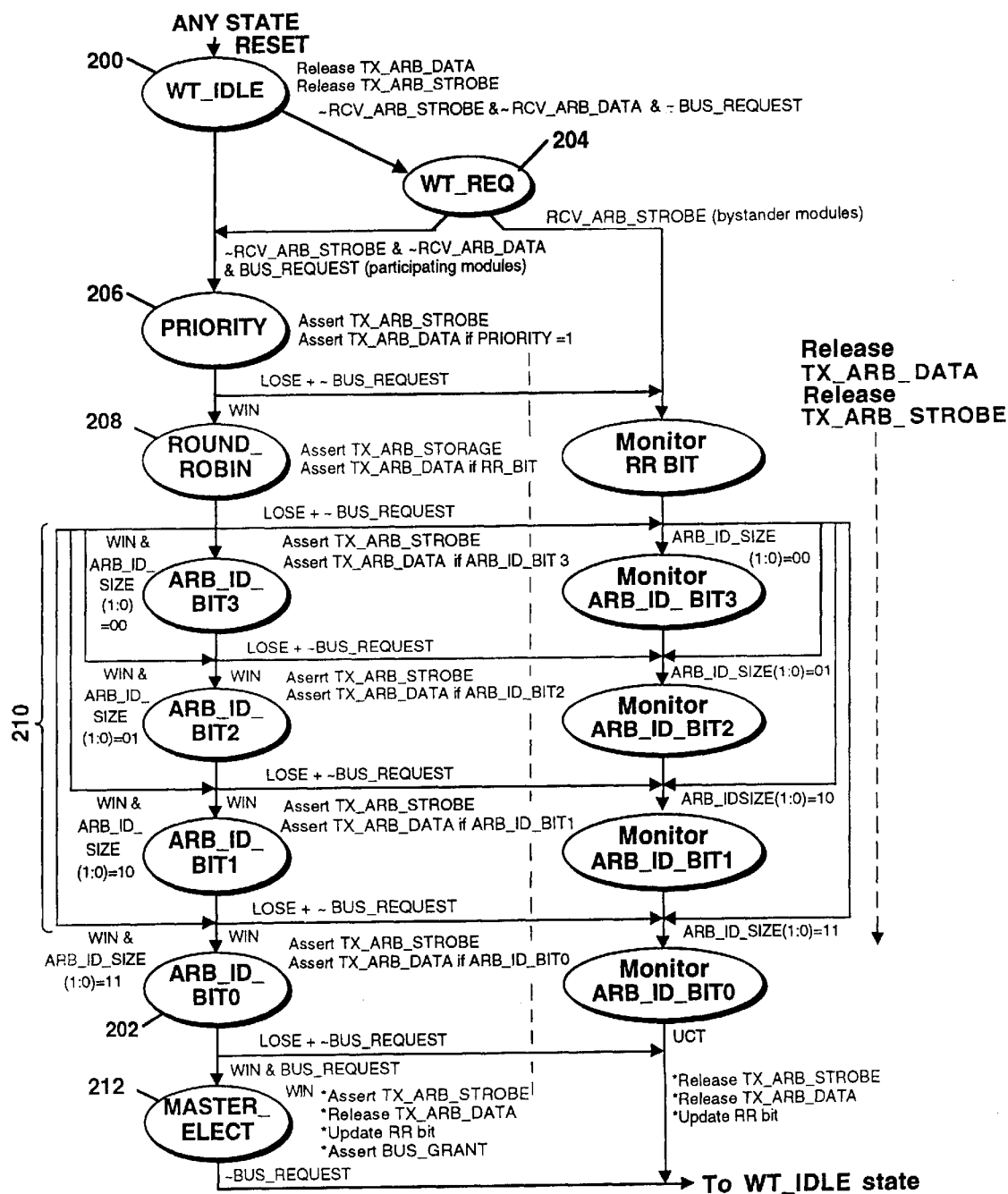
FIG. 4 is a state diagram detailing the arbitration process in accordance with the principles of the invention.

Referring to FIG. 4, a state diagram for the serial arbitration logic found in the Arb 64, as shown in FIG. 2, is shown in detail. As mentioned previously, the WT_IDLE state 200 is entered under the following conditions:

o reset o by the master elect module when it receives an acknowledgment to the bus grant it passed to its data path logic (bus requests deasserts)

o when a bystander module exits the ARB_ID_BIT0 state o when a participating module losses arbitration and exits the ARB_ID_BIT0 state o when the arbitration winner is exiting the ARB_ID_BIT0 state and detects that the BUS_REQUEST from its data path is no longer asserted (the data path chose to abort the transaction).

Once a module enters the WT_IDLE state 200, it will no longer remain there until the global arbitration bus has reached the ARB_IDLE state 202. Once the arbitration bus has reached the WT_IDLE state 200, any module needing to request the bus 36 can start the arbitration process by asserting ARB_STROBE. Modules which do not have an immediate request pending move to the WT_REQ state 204.

Modules enter the WT_REQ state 204 from the WT_IDLE state 200 if they do not have a request pending when they detect the arbitration bus is idle. They will remain in this state until either they receive a bus request from the transmit data path or some other module(s) start an arbitration cycle.

The arbitration PRIORITY state 206 is used to signal high (ARB_DATA=1) or low (ARB_DATA=0) priority. Those modules whose priority matches the value signed on the bus 36 continue to participate.

The serial arbitration ROUND_ROBIN state 208 is used to signal if any request is from a module waiting a turn (RR bit is set in modules Arb). If a module is participating then it drives the ARB_DATA line with its RR bit (each module has two RR bits, one for each priority). Those modules whose RR bit matches the value signaled on the bus 36 continue to participate.

During the serial arbitration ROUND_ROBIN states 210, the participating modules signal their arbitration numbers. The module with the highest number will win. Following the ARB_ID_BIT0 state 202 the winning module will transition to the MASTER_ELECT state 212 while all other modules transition to the WT_IDLE state 200. If the winning module's BUS_REQUEST line has deasserted, this is an indication that the transmit data path wishes to abort the packet—in this case the winning module transitions directly to the WT_IDLE state 200 and does not assert a BUS_GRANT to the transmit data path.

It should be noted that the number of ARB_ID_BITx states may be altered to minimize the arbitration time based on the number of modules using the bus 36. All modules must be programmed for the same number of ARB_ID_BITx states.

The winning module signals the MASTER_ELECT state 212 by releasing the ARB_DATA line and keeping the ARB_STROBE line asserted. All other modules will have released these lines. The MASTER_ELECT module signals a BUS_GRANT to its transmit data path and remains in this state until the data bust becomes idle, and its transmit data path logic starts transmission. The transmit data path signals the Arb 64 by deasserting the bus request at this time, allowing transition to the WT_IDLE state 200.

If the MASTER_ELECT module decides not to transmit the packet for which it requested the bus 36, it is required to release ARB_STROBE and transition to the WT_IDLE state 200.

Figure 5:
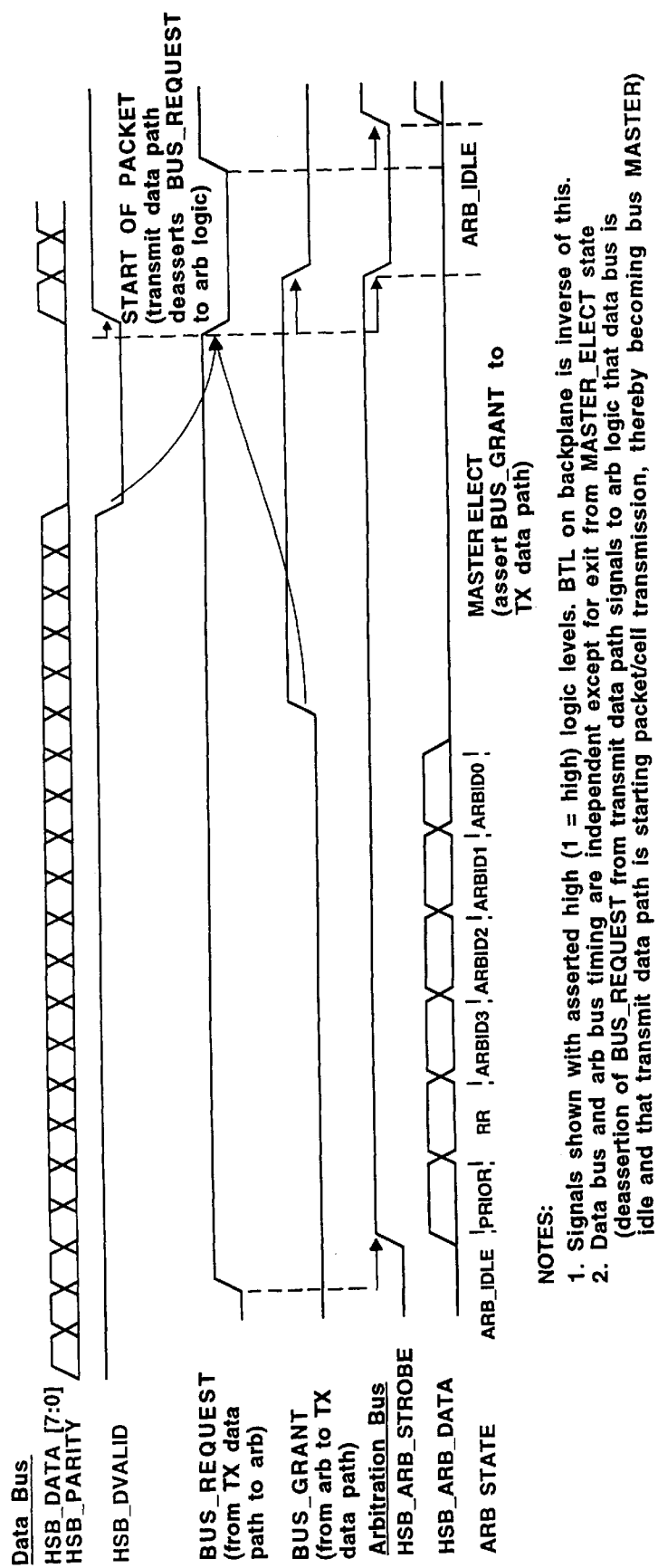
FIG. 5 is a timing diagram showing the between the data bus and the arbitration bus.

Referring to FIG. 5, the timing relationship between the data bus 68 and the arbitration bus 66A/66B is illustrated. It should be noted that the arbitration states are not drawn to scale with respect to the data baud interval nor is the inter-packet gap shown to scale.

Having described a preferred embodiment of the invention, it will now become apparent, to one skilled in the art that other embodiments incorporating its concepts may be used. It is felt therefore, that this embodiment should not be limited to the disclosed embodiment, but rather should be limited only by the spirit and scope of the appended claims.

What is claimed is:

1. A method of round robin bus arbitration for a system comprising first and second modules connected by a bus having a plurality of data lines and an arbitration unit, the method comprising the steps of:

setting the bus to a wait state;

signaling a first bus request to the bus for the first module needing to transmit a first plurality of data packets on to the bus, the first module having a first module priority level and a first unique arbitration number;

signaling a second bus request to the bus for the second module needing to transmit a second plurality of data packets on to the bus, the second module having a second module priority level and a second unique arbitration number;

setting a bus priority level according to a comparison of the first module priority level and the second module priority level wherein the bus priority level is set to one of the first and second module priority levels as determined by which module priority level has a higher priority than the other;

asserting the first unique arbitration number on the bus for the first module;

asserting the second unique arbitration number on the bus for the second module;

determining whether the first module and the second module has either been previously granted bus access and is asserting a new request or has been waiting its turn for the bus;

comparing the first unique arbitration number and the second unique arbitration number;

scheduling transmission of data packets in response to the steps of determining and comparing; and repeating the steps of setting, signaling, setting, asserting, determining, comparing, and scheduling, wherein, when the first and second module priority levels are not the same, the transmission of the module with the module priority level equal to the bus priority level is scheduled first, wherein, when the first and second module priority levels are the same, and one module has been previously granted bus access, the transmission of the module that has been waiting for the bus is scheduled first, and wherein, when the first and second module priority levels are the same, and each module has been waiting for the bus, the transmission of the module that has a higher arbitration priority unique arbitration number is scheduled first.

2. The method of round robin bus arbitration according to claim 1 wherein the bus includes two data lines.

3. The method of round robin bus arbitration according to claim 1 wherein the step of setting the bus to the wait state occurs in response to one of the following conditions:

a reset signal on the bus;

a deasserting signal from one of the modules;

an "exit from arbitration" signal from one of the modules;

a "lose arbitration" signal from one of the modules; and a "win arbitration" signal from one of the modules.

4. The method of round robin bus arbitration according to claim 2 wherein the two data lines of the bus include:

an ARB_STROBE line, the ARB_STROBE line carrying a WIRED-OR signal asserted by the first and second modules during an arbitration sequence; and an ARB_DATA line, the ARB_DATA line carrying a signal used for an arbitration signaling process.

5. The method as recited in claim 1, wherein a lowest value module priority level has the higher priority.

6. The method as recited in claim 1, wherein a highest value module priority level has the higher priority.

7. The method as recited in claim 5, wherein a lowest value unique arbitration number has the higher arbitration priority.

8. The method as recited in claim 6, wherein a lowest value unique arbitration number has the higher arbitration priority.

9. The method as recited in claim 5, wherein a highest value unique arbitration number has the higher arbitration priority.

10. The method as recited in claim 6, wherein a highest value unique arbitration number has the higher arbitration priority.

11. The method as recited in claim 1, wherein the first and second modules arc connected to an arbitration data bus having two lines on which the first and second unique arbitration numbers are compared in a round-robin mode of operation.

12. The method as recited in claim 11, wherein the arbitration data bus has a WIRED-OR bus configuration.

* * * * *